July 14, 1953 — O. VALENTA — 2,645,509
COUPLING DEVICE FOR TUBULAR ELEMENTS
Filed May 5, 1949

INVENTOR.
OLDRICH VALENTA
BY

Patented July 14, 1953

2,645,509

UNITED STATES PATENT OFFICE 2,645,509

COUPLING DEVICE FOR TUBULAR ELEMENTS

Oldřich Valenta, Prague, Czechoslovakia

Application May 5, 1949, Serial No. 91,601
In Czechoslovakia April 30, 1946

1 Claim. (Cl. 287—2)

The present invention relates to a coupling device for tubular elements.

It is the object of the present invention to provide a coupling device for joining coaxial aligned tubular structural elements, such as are used for scaffolds for buildings.

The coupling device according to the invention comprises two tube segments embraced by a ring with a setting screw screwed into a radial threaded hole in one of said segments and pressing from the inside against the other tube segment.

The term "tube segment" as used in specification and claim is intended to define an elongated straight member having the cross section of an arc forming part of a circle.

According to a particular embodiment one of these tube segments is fixed to the embracing ring, while the other tube segment passes freely through the ring, the threaded hole for the setting screw being arranged in this free tube segment, while the setting screw passes freely through a guiding hole in the ring. The part of the tube segment containing the threaded hole may be reinforced if thin tube segments are used. This segment may be furthermore provided with an offset portion having a width corresponding to the width of the ring embracing both segments so as to connect tubes of slightly different diameter.

Figure 1:
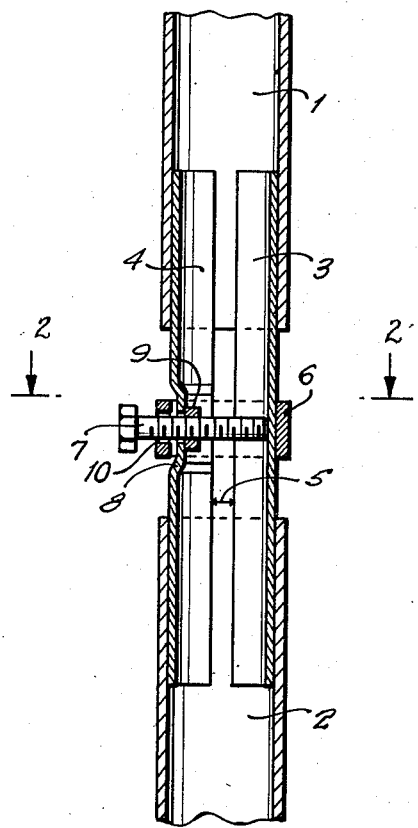
Figure 2:
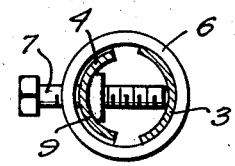

The invention will be best understood with reference to the accompanying drawings in which:

Fig. 1 is a longitudinal sectional view of a preferred embodiment of the invention; and Fig. 2 is a cross-sectional view taken on line 2—2 in Fig. 1.

Two tubes 1 and 2 of circular cross section, which are to be coupled, are arranged coaxially at a certain distance. The coupling device consists of two tube segments 3 and 4, embraced by a ring 6, the segments being inserted into both tubes 1 and 2 leaving the ring 6 beyond the tubes. A certain distance 5 is maintained between the segments 3 and 4. The segment 3 is fixed by soldering, welding or in any other way to the ring 6, while the segment 4 is freely inserted into this ring and provided with a radially offset portion 8 having a width corresponding to the width of the ring 6. A threaded hole is provided in the segment 4 within the offset part by means of a reinforcing nut 9 welded over a hole in the segment or secured thereto in any way known to those skilled in the art. The ring 6 has a hole 10, through which a screw 7 may freely pass, said screw being screwed into the threaded hole in the nut 9 or the segment 4 and pressing against the inside of the segment 3. The place where the tip of the screw 7 abuts against the segment 3 may be depressed to a certain extent.

When using this coupling device, the screw 7 is set in a way to reduce the outside diameter of the two tube segments and both ends of the segments are inserted into the tubes 1, 2, to be coupled. Thereafter the screw 7 is screwed into the segment 4 until the segments 3, 4, come into contact with the inside of the tubes 1 and 2 and are pressed against the tubes with a certain pressure, forming thus a frictional coupling.

The offset portion 8 assures that both tube segments are in exact contact with the tubes 1, 2, even if tubes are used that are not calibrated, a space being left between the ring and the segment 4.

The arrangement of the described embodiment has the advantage that all parts of the coupling device form a unit, so that even if the coupling is not used, all parts are held together by means of the screw 7. It is of course possible to arrange the threaded hole for the screw 7 in the tube segment 3, which is fixed to the ring 6. This arrangement has the disadvantage, that the segment 4 may freely move within the ring 6 in the axial direction, if no other means are provided for holding it in place.

The coupling device is suitable for coupling tubular structural elements of circular or other cross section, which are subject to pressure, bending, or moderate tensile forces, and may be mounted in any position.

Having now particularly described the nature of my invention, and its operation, what I claim is:

A coupling device for axially aligned tubes comprising, in combination, a first elongated tube segment; an embracing ring embracing said first elongated tube segment and rigidly secured thereto in the middle thereof, and having a guiding hole arranged opposite said first elongated tube segment; a second elongated tube segment disposed opposite said first elongated tube segment within said embracing ring, having the portion embraced by said embracing ring reduced in diameter and provided with a threaded hole in the middle thereof; a screw passing from the outside through said guiding hole in said embracing ring and being screwed in the said threaded hole in said second tube segment and abutting with its tip against the center of the inner face of said first tube segment so that said tube segments are forced apart when said screw is turned.

OLDŘICH VALENTA.

References Cited in the file of this patent

UNITED STATES PATENTS

| Number | Name | Date |
|---|---|---|
| 1,199,052 | Crawford | Sept. 26, 1916 |
| 1,678,350 | Ott | July 24, 1928 |
| 2,511,034 | Barton | June 13, 1950 |

FOREIGN PATENTS

| Number | Country | Date |
|---|---|---|
| 52,639 | Norway | June 6, 1933 |
| 80,706 | Czechoslovakia | of 1951 |